(12) United States Patent
Aikawa et al.

(10) Patent No.: US 6,721,122 B2
(45) Date of Patent: Apr. 13, 2004

(54) DISK DRIVE UNIT AND CONTROL METHOD FOR SAME

(75) Inventors: Koichi Aikawa, Kawasaki (JP);
Tatsuro Sasamoto, Kawasaki (JP);
Susumu Yoshida, Kawasaki (JP);
Akihide Jinzenji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 602 days.

(21) Appl. No.: 09/735,055

(22) Filed: Dec. 11, 2000

(65) Prior Publication Data

US 2002/0135928 A1 Sep. 26, 2002

(30) Foreign Application Priority Data

Jun. 1, 2000 (JP) ........................................ 2000-164944

(51) Int. Cl.[7] .............................................. G11B 5/596
(52) U.S. Cl. ..................................................... 360/77.02
(58) Field of Search ........................... 360/77.02, 78.09, 360/78.06, 78.01, 78.07, 75, 97.03

(56) References Cited

U.S. PATENT DOCUMENTS

| | | | | |
|---|---|---|---|---|
| 5,184,055 A | * | 2/1993 | Ohishi et al. | 318/615 |
| 5,285,431 A | * | 2/1994 | Ogawa | 369/30.15 |
| 5,299,075 A | * | 3/1994 | Hanks | 360/77.02 |
| 5,371,449 A | * | 12/1994 | Tajima et al. | 318/560 |
| 5,426,545 A | * | 6/1995 | Sidman et al. | 360/78.09 |
| 5,511,930 A | * | 4/1996 | Sato et al. | 414/676 |
| 5,754,358 A | * | 5/1998 | Yatsu | 360/78.09 |
| 5,812,752 A | * | 9/1998 | Yamada | 714/5 |
| 5,818,651 A | * | 10/1998 | Nomura | 360/78.06 |
| 5,859,742 A | * | 1/1999 | Takaishi | 360/78.01 |
| 5,986,845 A | * | 11/1999 | Yamaguchi et al. | 360/75 |
| 6,118,616 A | * | 9/2000 | Jeong | 360/78.07 |
| 6,225,770 B1 | * | 5/2001 | Heinrich et al. | 318/463 |
| 6,236,527 B1 | * | 5/2001 | Uchiike et al. | 360/75 |
| 6,243,226 B1 | * | 6/2001 | Jeong | 360/78.07 |
| 6,257,062 B1 | * | 7/2001 | Rich | 73/514.32 |
| 6,295,507 B1 | * | 9/2001 | Sasamoto et al. | 702/104 |
| 6,429,997 B1 | * | 8/2002 | Oida | 360/78.07 |
| 6,597,532 B1 | * | 7/2003 | Usui et al. | 360/97.03 |

* cited by examiner

*Primary Examiner*—David Hudspeth
*Assistant Examiner*—Fred F. Tzeng
(74) *Attorney, Agent, or Firm*—Greer, Burns & Crain, Ltd.

(57) ABSTRACT

A disk drive unit includes acceleration sensors mounted thereon. A sequence for calculating an amount by which a head actuator is adjusted during recording and readout operations is changed based on an output from the acceleration sensors.

13 Claims, 15 Drawing Sheets

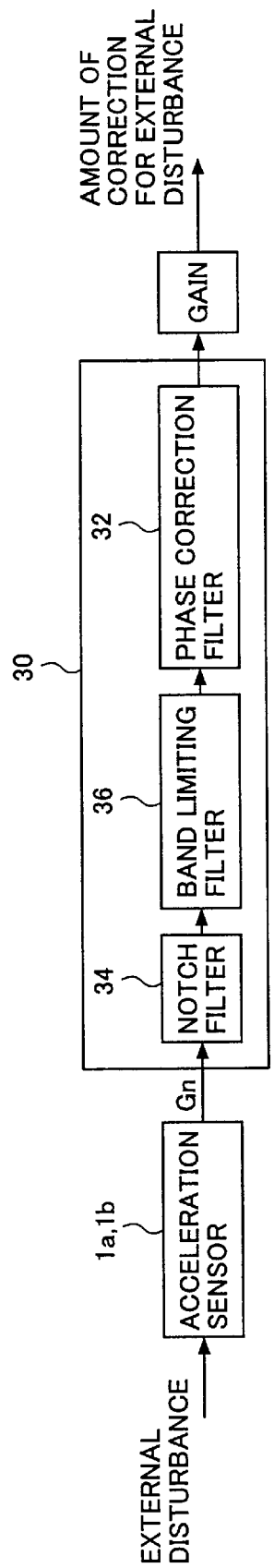

DISK DRIVE UNIT AND CONTROL METHOD FOR SAME

BACKGROUND OF THE INVENTION

1. Field of the Invention

The present invention relates generally to a disk drive unit mounting an acceleration sensor and a control method for the disk drive unit, and more particularly, to a device and method for compensating for the effects of an external disturbance on a disk drive unit mounting one or more acceleration sensors.

2. Description of Related Art

Conventionally, in the field of magnetic disk drive units, the magnetic recording and/or readout (hereinafter recording and readout) of information to and from a rotating recording medium such as a magnetic or optical disk involves positioning the magnetic head appropriately with respect to the rotating disk so as to carry out optimum magnetic recording and readout.

In such cases, external disturbances imparted to the disk drive unit can affect the positioning of the magnetic head. In particular, the rotary-type actuator that is sometimes used as a magnetic head drive mechanism is particularly susceptible to external disturbances which coincide with a radial direction of the rotating disk (hereinafter referred to as a radial disturbance).

One method that has been proposed for correcting for the effects of such external disturbances on the positioning of the magnetic head with respect to the rotating disk involves mounting acceleration sensors on the magnetic disk drive unit frame or on top of the printed circuit board, sensing vibrations from external disturbances or from the reaction of the magnetic disk drive unit itself to a seek operation, and using the data so detected to correct for the effects of the vibrations. In particular, one method for sensing vibrations due to external disturbances in a radial direction of the rotating disk involves using a single acceleration sensor to detect directly the angular velocity imparted by the external disturbance.

The disadvantage of the above-described method is that the acceleration sensor is either expensive, has a low frequency response, or is relatively large.

In contrast to the above-described method, another, less expensive, method has been proposed in which two acceleration sensors are disposed along a single axis on the magnetic disk drive unit for sensing vibrations along the single axis (including the vibrational component of the external disturbance along such single axis), and processing the output of these acceleration sensors to obtain the effects of the external disturbance along both the single axis and the radial direction.

Examples of such conventional dual-sensor arrangements are shown in FIG. 1 and FIG. 2.

FIG. 1 is an abbreviated plan view of a printed circuit board portion of a conventional magnetic disk drive unit upon which two acceleration sensors are mounted. FIG. 2 is a diagram illustrating an operation of a conventional magnetic disk drive unit upon which acceleration sensors are mounted.

As shown in the diagrams, two acceleration sensors 1a, 1b are located at a right edge section of the circuit board 2, spaced a distance L apart. Servo information recorded on a magnetic disk 3 is read by a magnetic head 4. A servo signal read from the magnetic head 4 is amplified by a playback amplifier 5a and demodulated to position data by servo demodulation circuit 5b. The position data from the servo demodulation circuit 5b is then taken in by a microprocessor 6.

At the same time, data indicating detection of a disturbance by the acceleration sensors 1a, 1b (hereinafter referred to as disturbance data) is also taken in by the A/D converter 6a of the microprocessor 6.

The position data and disturbance data read in by the microprocessor 6 are then processed by a CPU 6c using a program recorded in a memory 6b in order to generate a control signal.

The control signal is then sent via a DA converter 6d to a VCM driver 7 in order to drive a voice coil motor (VCM) 8 so as to position the magnetic head 4, such position being corrected for the effects of the external disturbance.

In this case, the radial disturbance is obtained as angular acceleration ω (in units of rad/sec$^2$). However, this angular acceleration ω is obtained from outputs G1, G2 (units: G) of the two acceleration sensors and the distance L (in meters) between the two acceleration sensors according to the following formula (where g is 9.8 m/sec$^2$):

$$\omega = (G1 - G2)g/L$$

FIG. 3 is a circuit diagram illustrating the operation of a magnetic disk drive unit mounting the conventional acceleration sensor.

As shown in the diagram, the disturbance data provided by the acceleration sensors 1a, 1b is then processed by the filter 9a and gain adjusted to get a correction signal Sb. By subtracting the correction signal Sb from an output signal Sa of a controller 9b of an ordinary feedback control system, a command value S that cancels the disturbance is imparted to a control object 9c.

However, a disadvantage of the above-described conventional arrangement arises if there is a disparity in sensitivity between the two acceleration sensors when using the difference between the output values of the two acceleration sensors (which sense movement in a direction parallel to a surface of the disk) in order to obtain an amount of movement in a radial direction, because the vibration component in the direction parallel to the surface of the disk cannot be cancelled, thus producing incorrect radial disturbance data for the difference in detected values leading to improper disturbance correction.

Another disadvantage of the above-described conventional arrangement arises if there is a phase lag in the radial disturbance data detected by the acceleration sensors, which in turn leads to improper disturbance correction.

SUMMARY OF THE INVENTION

Accordingly, it is a general object of the present invention to provide an improved and useful disk drive unit control method and disk drive unit, in which the above-described disadvantages are eliminated.

The above-described object of the present invention is achieved by a control method for a disk drive unit upon which are mounted acceleration sensors, the control method comprising the step of changing a sequence for calculating an amount by which a head actuator is adjusted during recording and readout operations based on an output from the acceleration sensors.

According to the invention described above, adverse effects to the feedback system can be prevented when performing feed forward correction control of a radial disturbance.

Additionally, the above-described object of the present invention is achieved by a control method for a disk drive unit upon which are mounted two acceleration sensors positioned a predetermined distance apart, the control method comprising the step of changing a sequence for calculating an amount by which a head actuator is adjusted during recording and readout operations based on an output from the two acceleration sensors sensing parallel components of an external disturbance on the disk drive unit in a direction parallel to a surface of a disk.

It should be noted that the direction parallel to the surface of the disk is meant to include, but not be limited to, a radial direction of the disk to be described later, and, as such, constitutes a uniaxial direction. In the invention to be described below, in which acceleration sensors are positioned so as to sense acceleration in a same direction, this uniaxial direction is referred to as the parallel direction for ease of explanation, parallel in the sense that movement is in a direction parallel to a surface of the disk.

According to the invention described above, adverse effects to the feedback system can be prevented.

Additionally, the above-described object of the present invention is achieved by a disk drive unit upon which are mounted acceleration sensors, the disk drive unit comprising a correction control unit for changing a sequence for calculating an amount by which a head actuator is adjusted during recording and readout operations based on an output from the acceleration sensors.

Other objects, features and advantages of the present invention will become more apparent from the following detailed description when read in conjunction with the accompanying drawings.

BRIEF DESCRIPTION OF THE DRAWINGS

FIG. 15 is a diagram illustrating a corrective control unit of a magnetic disk drive unit upon which are mounted acceleration sensors according to a ninth embodiment of the present invention.

DETAILED DESCRIPTION OF THE PREFERRED EMBODIMENTS

Figure 1:
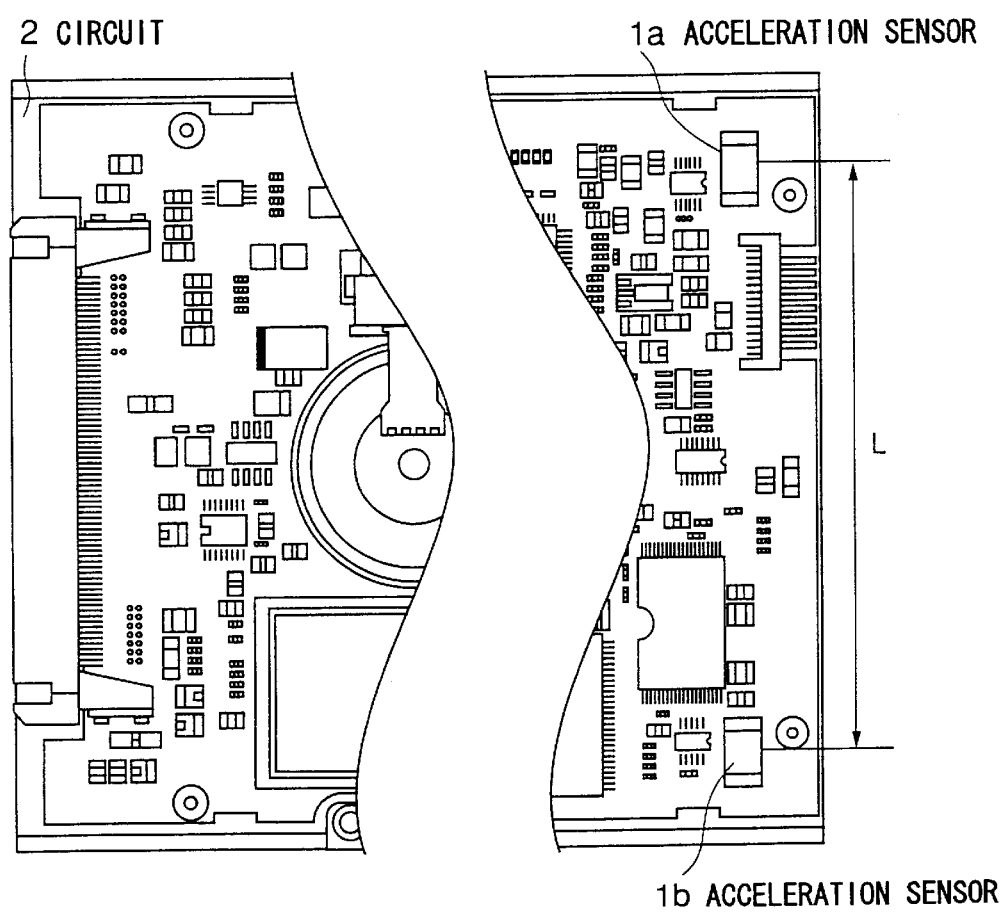
FIG. 1 is a partial cutaway plan view of a circuit board of a magnetic disk drive unit upon which are mounted conventional acceleration sensors.
Figure 2:
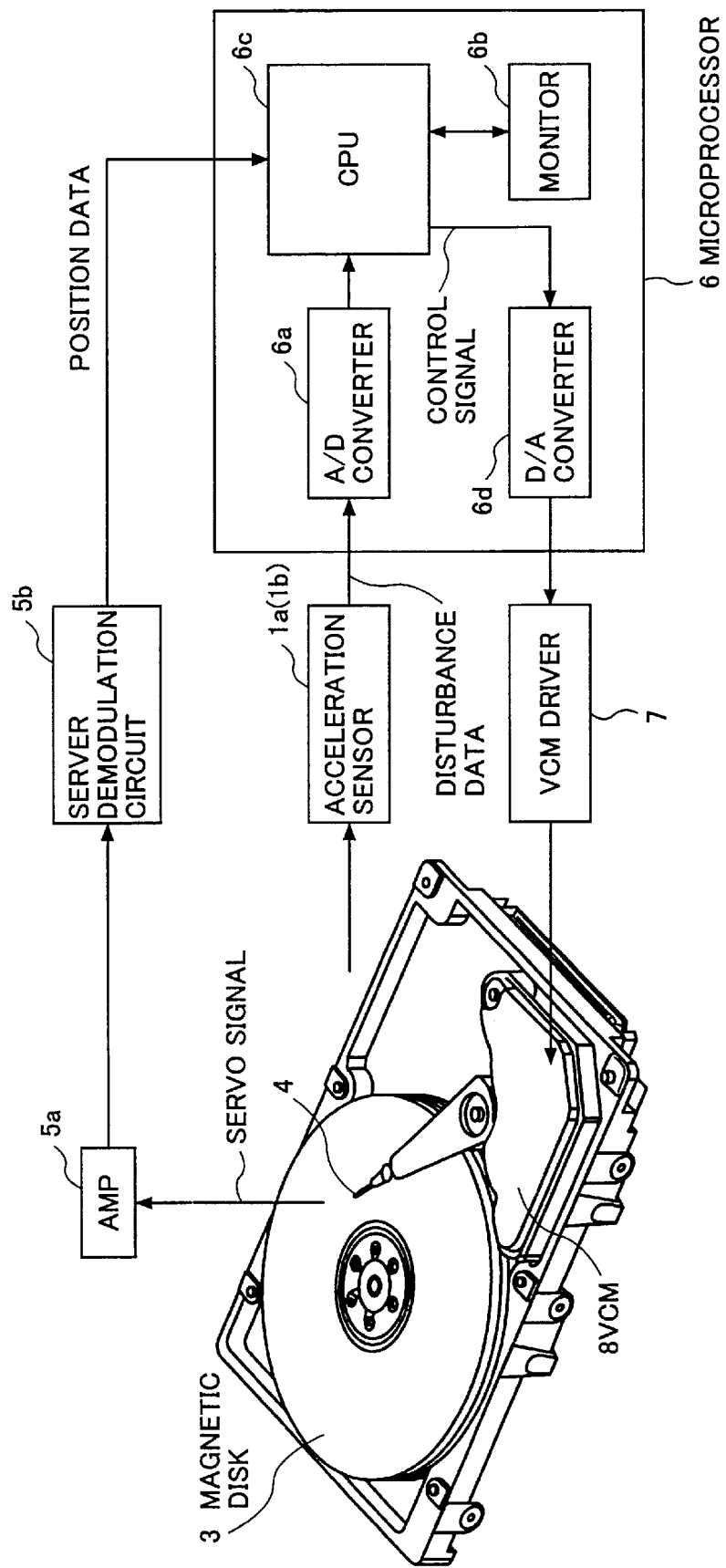
FIG. 2 is a diagram illustrating an operation of a magnetic disk drive unit upon which are mounted conventional acceleration sensors.

A description will now be given of embodiments of the present invention, with reference to the accompanying drawings. It should be noted that identical or corresponding elements in the embodiments are given identical or corresponding reference numbers in all drawings, with detailed descriptions of such elements given once and thereafter omitted. In addition, the following description involves a magnetic disk drive unit the basic configuration of which is essentially unchanged from that of the conventional magnetic disk drive unit shown in FIGS. 1, 2 and 3, and accordingly a detailed description thereof shall be omitted.

A description will now be given of a magnetic disk drive unit control method and disk drive unit according to a first embodiment of the present invention.

Figure 4:
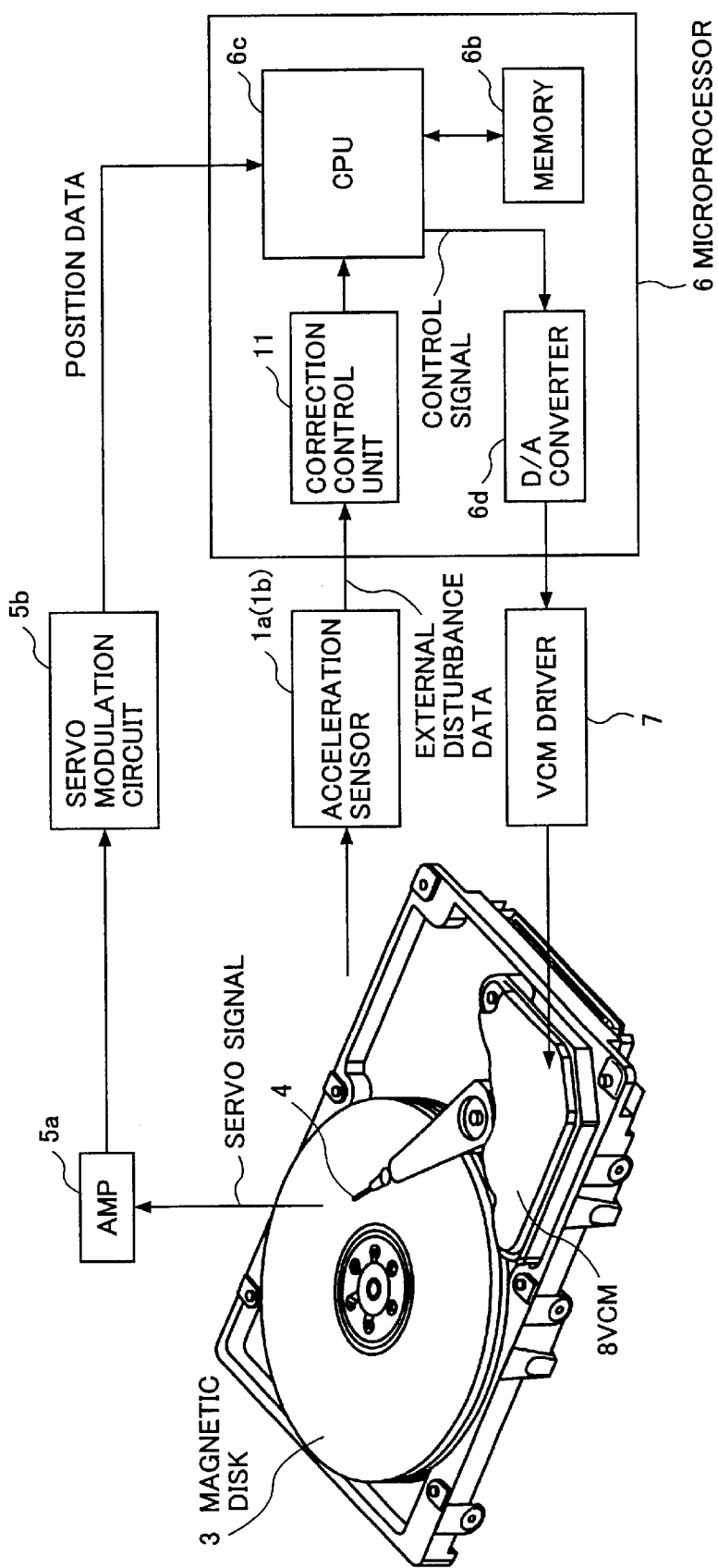
FIG. 4 is a diagram for illustrating an operation of a magnetic disk drive unit upon which are mounted acceleration sensors according to one embodiment of the present invention.
Figure 5:
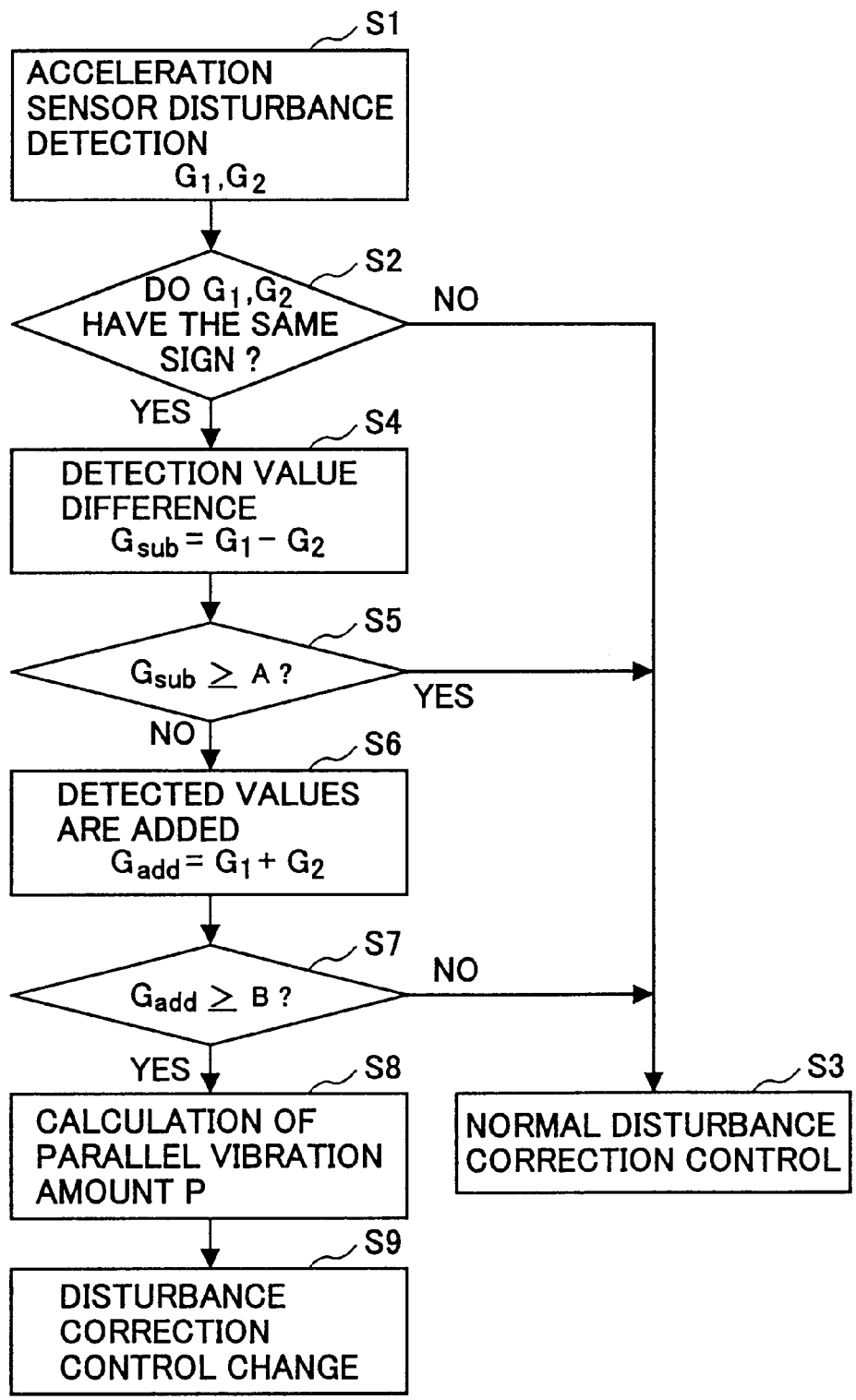
FIG. 5 is a flow chart showing steps in a correction control sequence of a magnetic disk drive unit upon which are mounted acceleration sensors according to a first embodiment of the present invention.

FIG. 4 is a diagram for illustrating an operation of a magnetic disk drive unit upon which are mounted acceleration sensors according to one embodiment of the present invention. FIG. 5 is a flow chart showing steps in a correction control sequence of a magnetic disk drive unit upon which are mounted acceleration sensors according to a first embodiment of the present invention.

For ease of explanation, a description will first be given of the control method.

First, in a step S1, the two acceleration sensors 1a, 1b detect an external disturbance in a parallel direction as well as a parallel direction component of a radial disturbance, that is, G1 and G2.

Next, in a step S2, it is determined whether or not G1 and G2 have the same sign, that is, whether or not the acceleration is in the same direction. If the signs are different, then it is clear that the radial disturbance is the larger of the two, and normal disturbance correction control is conducted in a step S3. In other words, the radial disturbance is calculated from the difference between G1 and G2, with normal disturbance correction control carried out. If, on the other hand, the signs of G1 and G2 are the same, then a differential between G1 and G2, that is, Gsub, is calculated in a step S4.

In a step S5, it is determined whether the disturbance G1, G2 difference Gsub meets or exceeds a threshold value given here as A. It should be noted that the threshold value A can be set according to experience or by experiment, taking into consideration the characteristics of the feedback control system of the magnetic disk drive unit microprocessor 6 as well as the vibrational characteristics of the external disturbance. When the difference Gsub of the disturbances G1, G2 meets or exceeds the threshold level, the radial disturbance is large enough so that effective disturbance correction control can be carried out (in the step S3) despite any disparity in sensitivity that might exist between the acceleration sensors. If on the other hand the difference Gsub of G1 and G2 falls below the threshold value A, then in a step S6 a sum Gadd of G1, G2 is calculated.

In a step S7, it is determined whether or not the sum Gadd of G1, G2 meets or exceeds a threshold value B. If the sum Gadd of G1, G2 is less than the threshold value B, then the parallel disturbance is small and the effect of any disparity in sensitivity between the acceleration sensors is negligible, and normal disturbance correction control is carried out in the step S3. If on the other hand the sum Gadd of G1, G2 meets or exceeds a threshold value B, then in a step S8 an amount of the parallel vibration P is calculated. Here, the parallel vibration amount P is a value defined as the difference of the sum Gadd of G1, G2 minus the difference Gsub between G1, G2. In this case, the absolute value of the sum of the disturbances G1, G2 may also be weighted. Finally, in a step S9 the disturbance correction control is changed to accord with the amount of the parallel vibration amount P.

It should be noted that in the step S6 and the step S7, instead of the sum of the disturbances G1 and G2, either one or the other of G1 or G2 may be used.

According to the magnetic disk drive unit control method and the disk drive unit of the first embodiment of the present invention as described above, the feedback system can be prevented from being adversely affected during feed forward correction control with respect to a radial disturbance by changing the disturbance correction control method as appropriate depending on the output from the acceleration sensors 1a, 1b. Such a method and device is particularly well suited to the rotary-type actuators used as head drive mechanisms in magnetic disk drive units.

A description will now be given of a magnetic disk drive unit control method according to a second embodiment of the present invention.

Figure 6:
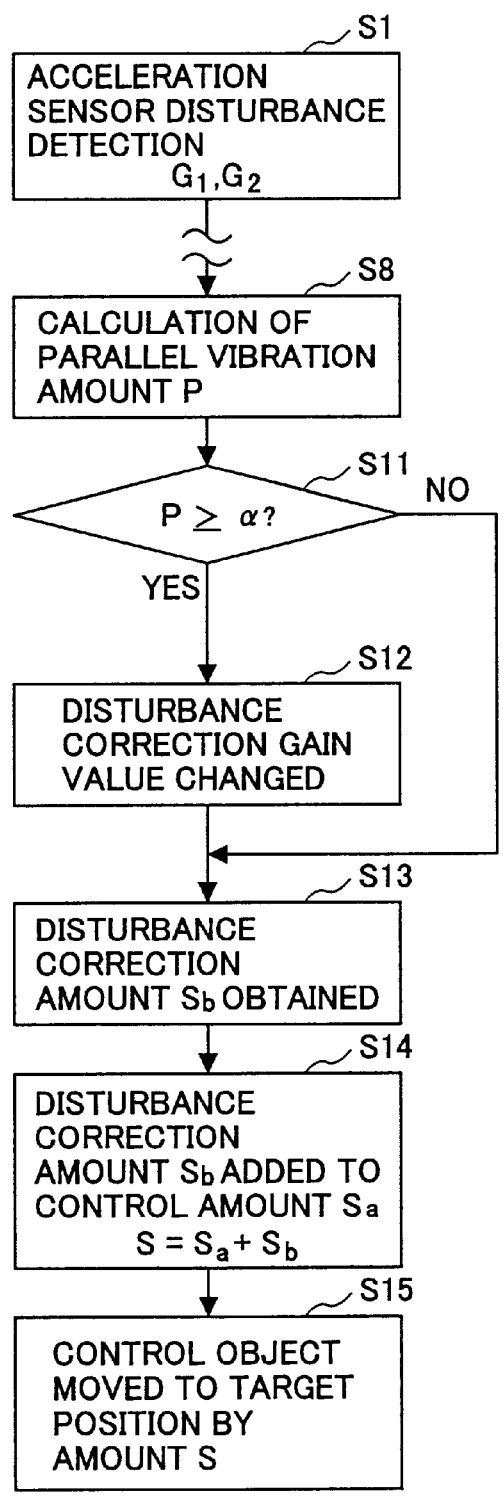
FIG. 6 is a flow chart showing steps in a correction control sequence of a magnetic disk drive unit upon which are mounted acceleration sensors according to a second embodiment of the present invention.

FIG. 6 is a flow chart showing steps in a correction control sequence of a magnetic disk drive unit upon which are mounted acceleration sensors according to a second embodiment of the present invention.

As with the magnetic disk drive unit control method according to the first embodiment of the present invention as described above, the steps S1 (acceleration sensor disturbance detection) through S8 (calculation of parallel vibration amount P) are performed.

Next, in a step S11, it is determined whether or not the parallel vibration amount P meets or exceeds a threshold value α. Here, the threshold value α is such that performing correction control based on parallel vibration amount P has no practical meaning, but rather, threshold value α should be thought of as a limit at which the control system is adversely affected by false detection of a radial disturbance due to discrepancies between the acceleration sensors and consequent performance of correction control. Additionally, this value can be set to an appropriate level by experiment.

If the parallel vibration amount P is below the threshold value α, there is no change to the disturbance correction gain and normal disturbance correction control is carried out (see the step S3 in FIG. 5). If on the other hand the parallel vibration amount P meets or exceeds the threshold value α, then the disturbance correction gain value is changed in a step S12, and disturbance correction gain Sb is obtained in a step S13 and added to a control amount Sa to obtain a control amount S in a step 514. In a step 515, the control object 9c is moved by an amount S to a target position.

According to the magnetic disk drive unit control method and the disk drive unit of the second embodiment of the present invention as described above, the same advantages can be obtained as with the first embodiment of the present invention described previously.

A description will now be given of a magnetic disk drive unit control method according to a third embodiment of the present invention.

Figure 7:
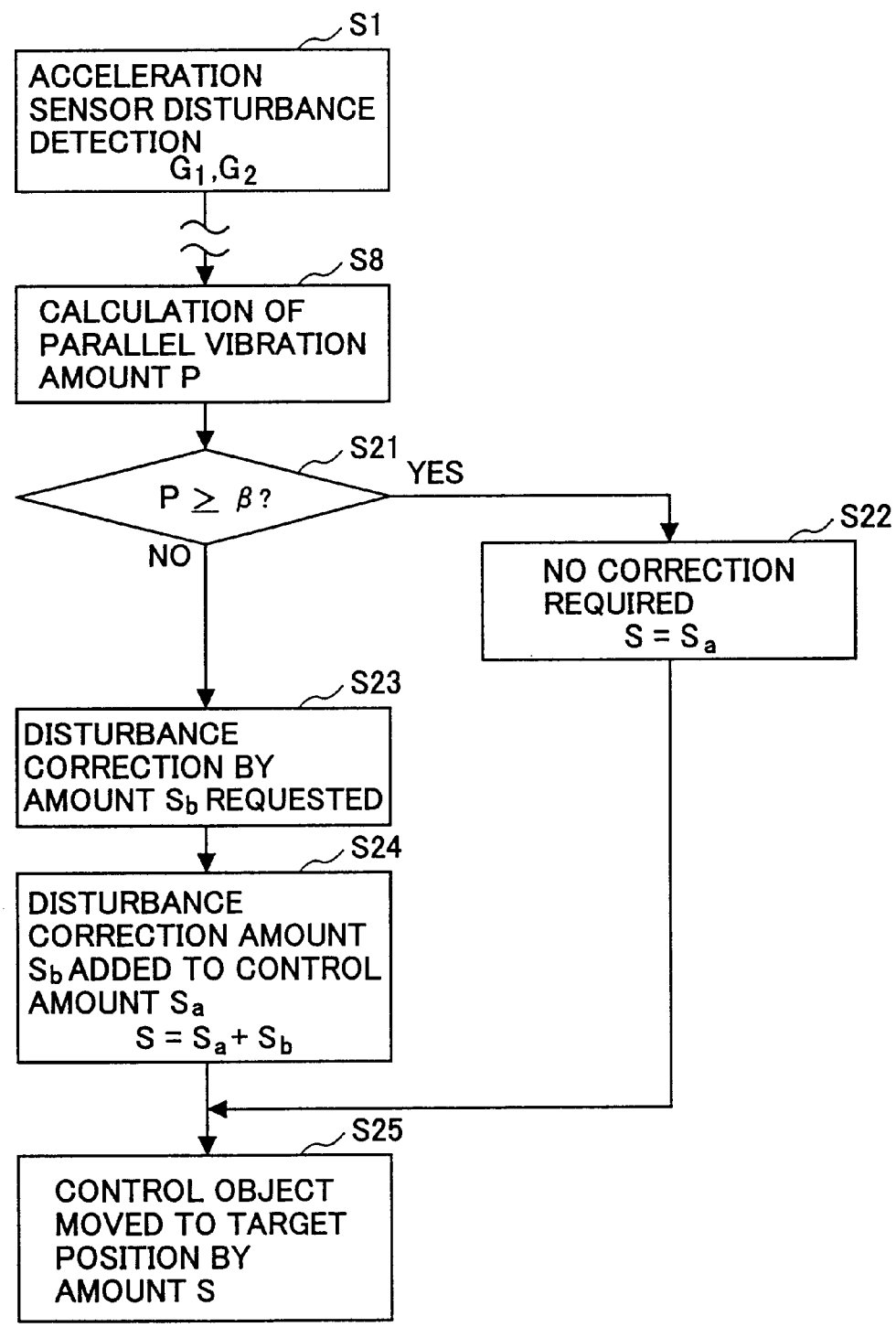
FIG. 7 is a flow chart showing steps in a correction control sequence of a magnetic disk drive unit upon which are mounted acceleration sensors according to a third embodiment of the present invention.

FIG. 7 is a flow chart showing steps in a correction control sequence of a magnetic disk drive unit upon which are mounted acceleration sensors according to a third embodiment of the present invention.

As with the magnetic disk drive unit control method according to the first embodiment of the present invention as described above, the steps S1 (acceleration sensor disturbance detection) through S8 (calculation of parallel vibration amount P) are performed.

Next, in a step S21 it is determined whether or not the parallel vibration amount P is above a threshold value β. Here, the threshold value β should be thought of as a limit at which the control system is adversely affected by performance of correction control based on the parallel vibration amount P due to false detection of a radial disturbance because of discrepancies between the acceleration sensors, and taking into account the magnetic disk drive unit microprocessor 6 feedback control system characteristics as well as the vibration characteristics. Additionally, this value can be set to an appropriate level by experiment.

Figure 3:
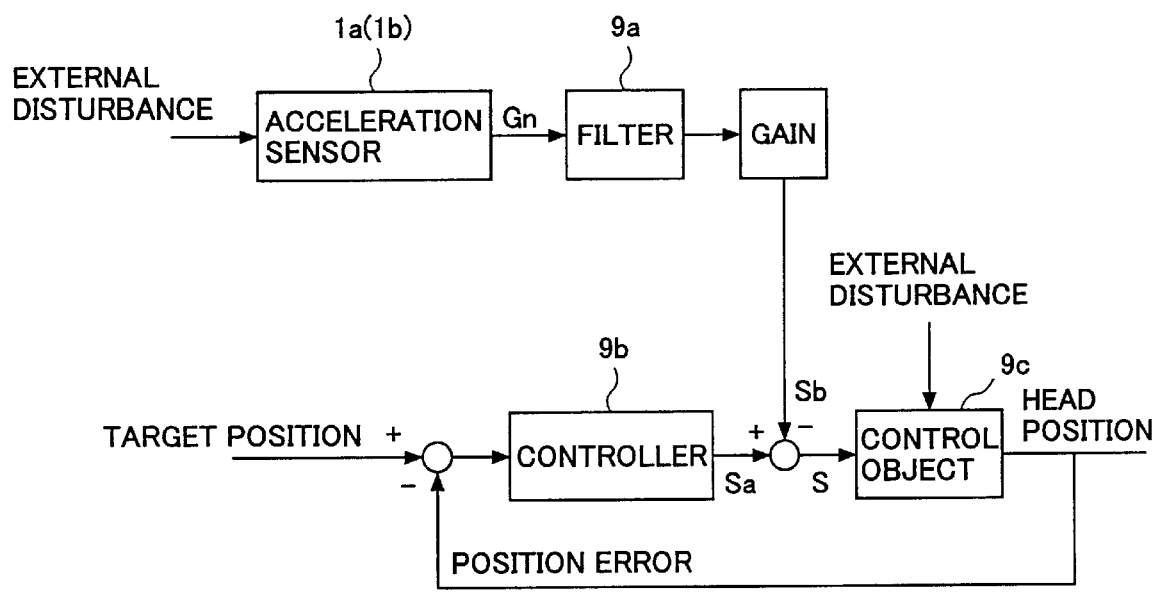
FIG. 3 is a circuit diagram illustrating the operation of a magnetic disk drive unit upon which are mounted conventional acceleration sensors.

If the parallel vibration amount P meets or exceeds the threshold value β, then no disturbance correction is carried out in a step S22, that is, a command value S that offsets the disturbance assumes the same value as the output signal Sa of the controller 9b, and in a step S25 the control object is moved to the target position by the amount S (refer also to FIG. 3). If on the other hand the parallel vibration amount P is below the threshold value β, then, as with the second embodiment described above, the steps S13 through S15 are performed and the disturbance correction gain value is changed, after which the disturbance correction amount Sb is sought in a step S23, the disturbance correction amount Sb is added to the control amount Sa to obtain the control amount S in a step S24, with the control object being moved to a target position by the control amount S in a step S25.

According to the magnetic disk drive unit control method and the disk drive unit of the third embodiment of the present invention as described above, the same advantages can be obtained as with the first embodiment of the present invention described previously.

A description will now be given of a magnetic disk drive unit control method according to a fourth embodiment of the present invention.

Figure 8:
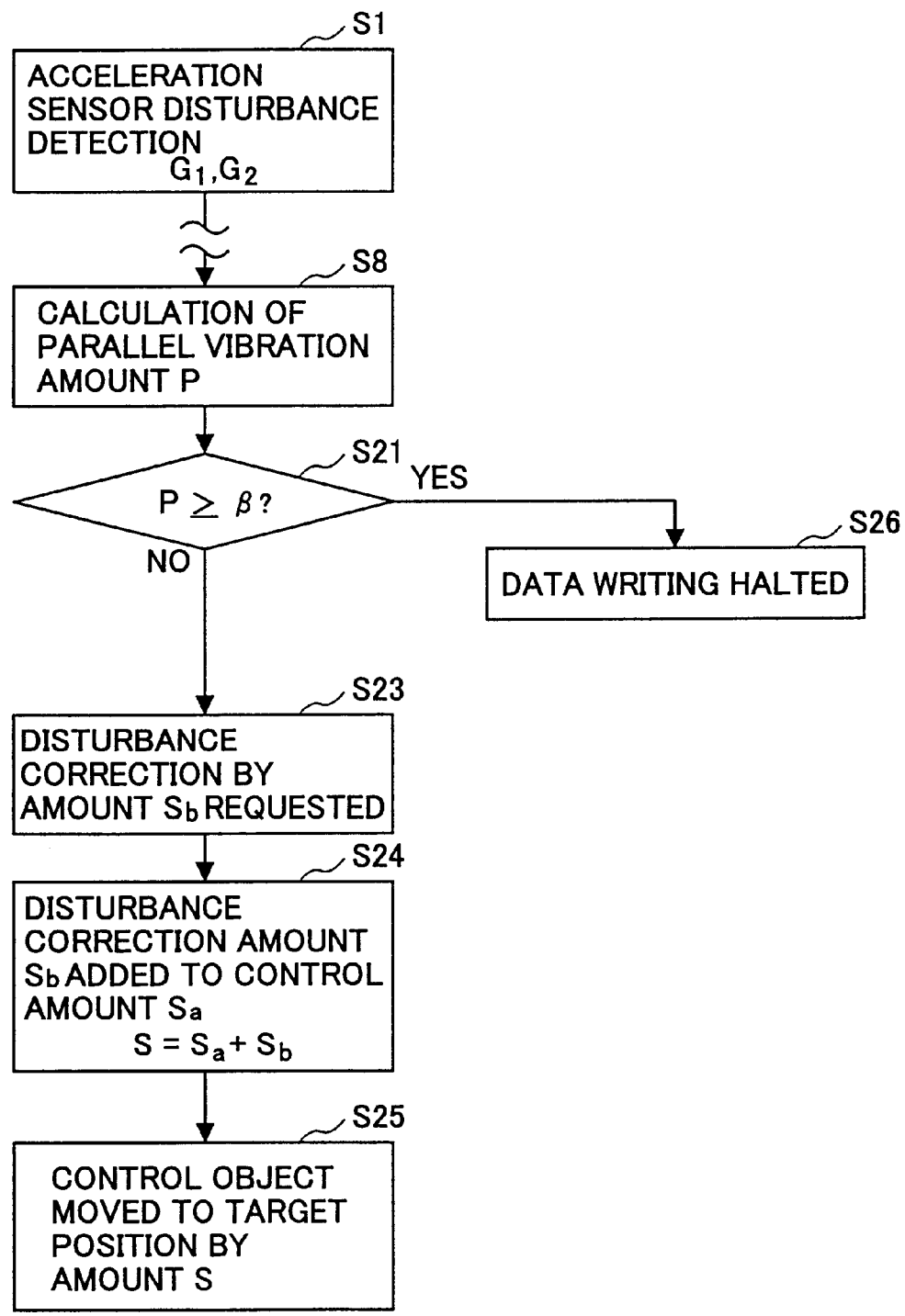
FIG. 8 is a flow chart showing steps in a correction control sequence of a magnetic disk drive unit upon which are mounted acceleration sensors according to a fourth embodiment of the present invention.

FIG. 8 is a flow chart showing steps in a correction control sequence of a magnetic disk drive unit upon which are mounted acceleration sensors according to a fourth embodiment of the present invention.

The magnetic disk drive unit control method according to the fourth embodiment of the present invention is related to the magnetic disk drive unit control method according to the third embodiment as described above, wherein it is determined in the step S21 whether or not parallel vibration amount P meets or exceeds the threshold value β, with the recording of data to the magnetic disk 3 terminated in a step S26 if the parallel vibration amount P does meet or exceed the threshold value β. By so doing, the data that has already been written to the disk can be protected.

A description will now be given of a magnetic disk drive unit control method according to a fifth embodiment of the present invention.

Figure 9:
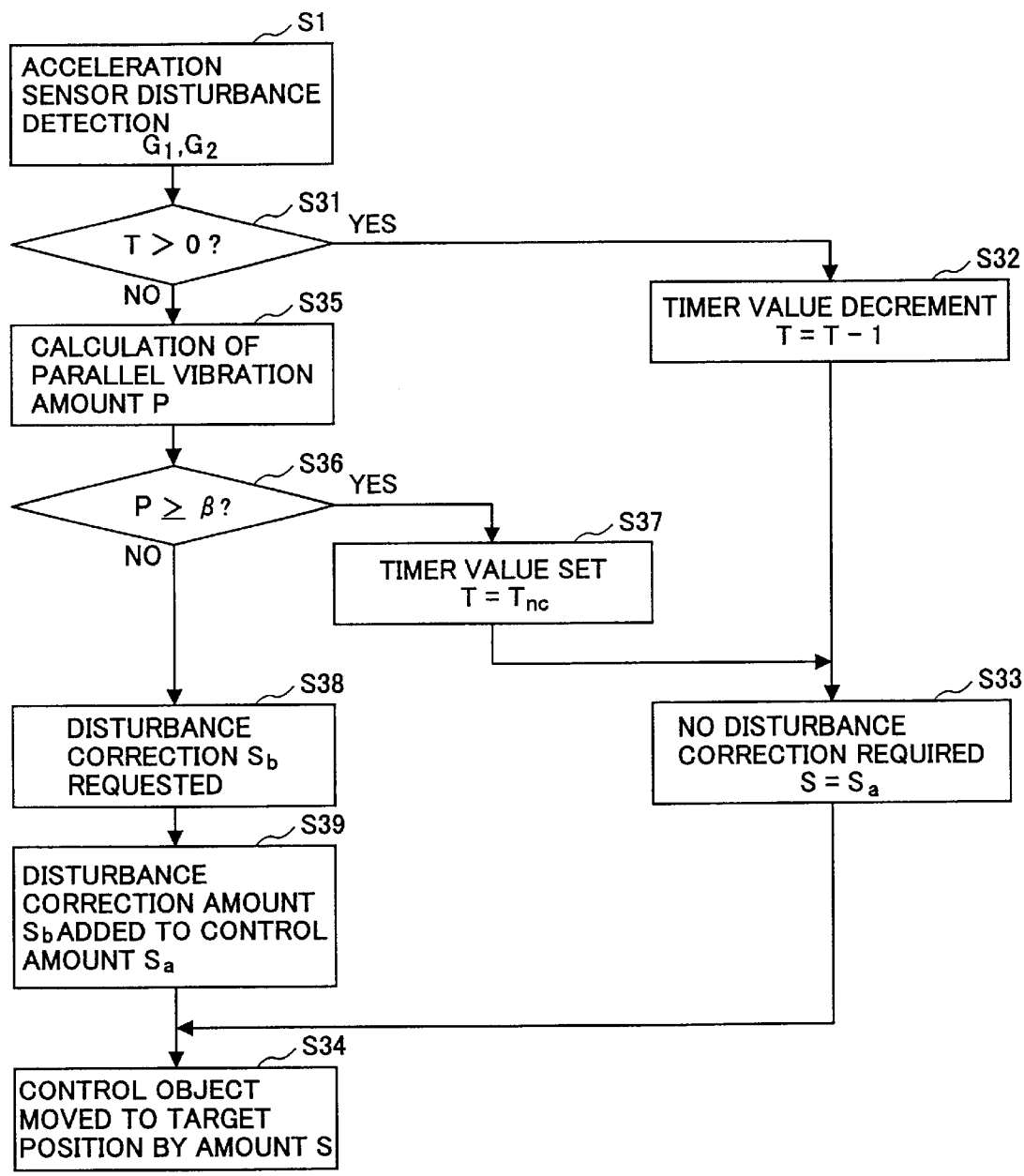
FIG. 9 is a flow chart showing steps in a correction control sequence of a magnetic disk drive unit upon which are mounted acceleration sensors according to a fifth embodiment of the present invention.

FIG. 9 is a flow chart showing steps in a correction control sequence of a magnetic disk drive unit upon which are mounted acceleration sensors according to a fifth embodiment of the present invention.

In this case, a timer incurs a decrement each time the disturbances G1, G2 that are the outputs of the two acceleration sensors 1a, 1b are sampled and an initial value Tnc is set thereto, such that when the timer value T is greater than zero no disturbance correction gain can be conducted. When the parallel vibration amount P is large during the initial value Tnc, the initial value Tnc may for example be set through experimentation to find the value at which false detection of a radial disturbance arising from discrepancies in the sensitivity of the acceleration sensors appears to adversely affect the control system.

Specifically, acceleration sensor disturbance detection G1, G2 is conducted in the step S1.

Next, in a step S31 it is determined whether or not the timer value T exceeds zero or not.

If the time value T does exceed zero, then a timer value T decrement is carried out in a step S32 such that T=T−1, no disturbance correction control is carried out in a step S33, and the control object 9c is moved to a target position by control amount S in a step S34. If on the other hand the timer value T is zero, then the parallel vibration amount P is calculated in a step S35 and, as with the step S21 according to the fourth embodiment described above, it is determined in a step S36 whether or not the parallel vibration amount P meets or exceeds the threshold value β.

If the calculated parallel vibration amount P meets or exceeds the threshold value β, then in a step S37 the timer value T is set to an initial value Tnc, no disturbance correction control is carried out in the step S33, and in the step S34 the control object 9c is moved by amount S to the target position. If on the other hand the parallel vibration amount P is less than the threshold value β, then an disturbance correction amount Sb is obtained in a step S38 and added to a control amount Sa to obtain a control amount S in a step S39. In the step S34, the control object 9c is moved by amount S to the target position.

According to the magnetic disk drive unit control method and the disk drive unit of the fifth embodiment of the present invention as described above, a repeated turning on and off of the disturbance correction control and consequent adverse effects on the control system when the disk drive unit parallel vibration amount is near the threshold value during operation of the disk drive unit can be prevented.

A description will now be given of a magnetic disk drive unit control method according to a sixth embodiment of the present invention.

Figure 10:
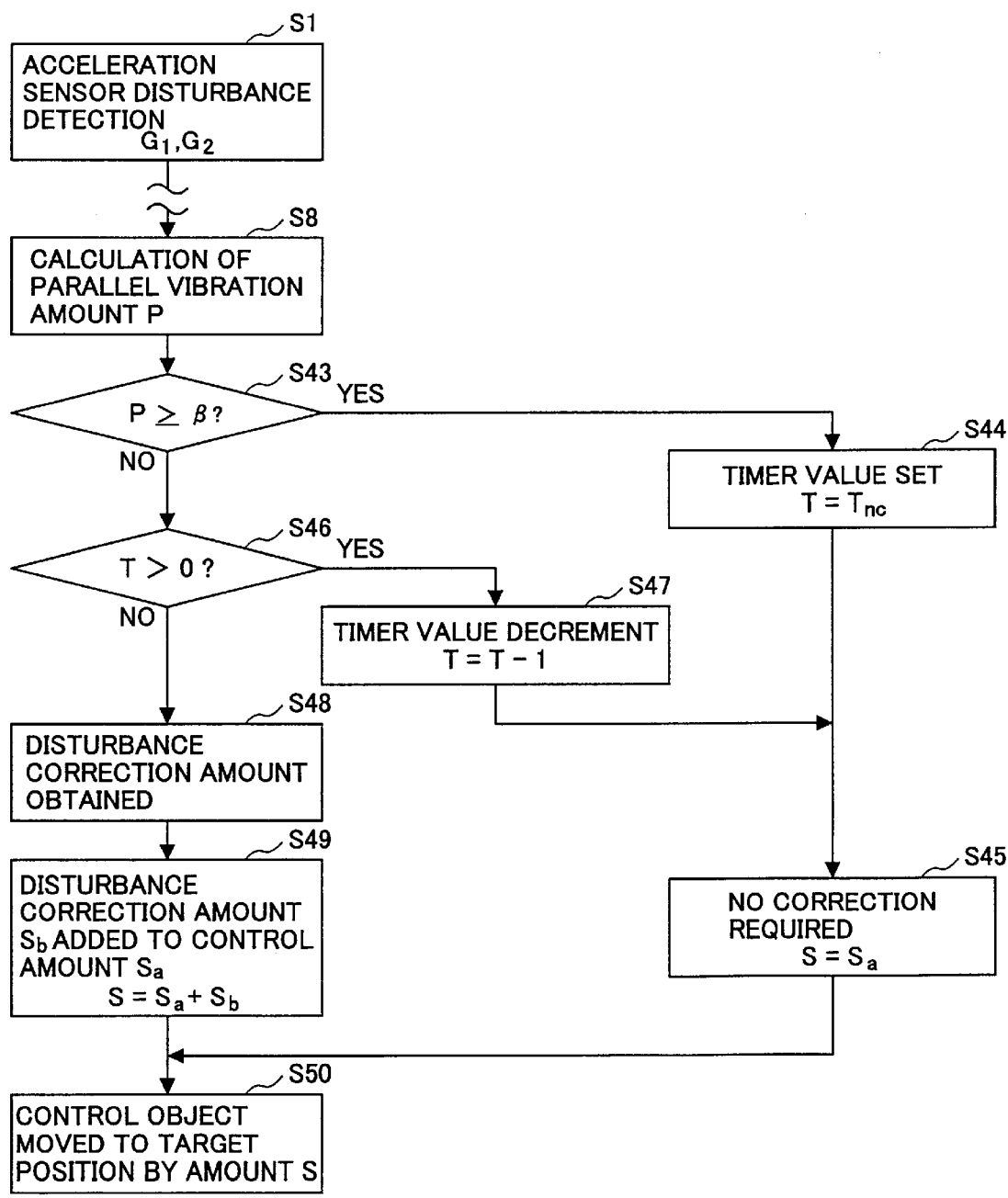
FIG. 10 is a flow chart showing steps in a correction control sequence of a magnetic disk drive unit upon which are mounted acceleration sensors according to a sixth embodiment of the present invention.

FIG. 10 is a flow chart showing steps in a correction control sequence of a magnetic disk drive unit upon which are mounted acceleration sensors according to a sixth embodiment of the present invention.

As can be seen from the flow chart, the sixth embodiment involves a change to one part of the sequence of the fifth embodiment of the present invention, such that when the parallel vibration amount P again meets or exceeds the threshold value β within a predetermined time period that is the initial value Tnc, a predetermined time period during which disturbance control is not carried out is again continued during predetermined time period Tnc.

Specifically, the parallel vibration amount P is calculated in the step S8 using the same sequence as for the first embodiment of the present invention as described above, and in a step S43 it is determined whether or not the parallel vibration amount P meets or exceeds the threshold value β.

If the parallel vibration amount P meets or exceeds the threshold value β, then in a step S44 the timer value T is set to the initial value Tnc, in a step S45 no disturbance correction control is conducted, and in a step S50 the control object is moved by control amount S to the target position. If at the next output sampling the parallel vibration amount P continues to meet or exceed the threshold value β in a step S43, then the timer value T undergoes no decrement but is reset to the initial value Tnc in a step S44. By so doing, as long as the parallel vibration amount P meets or exceeds the threshold value β a condition continues in which no disturbance correction control is carried out.

If on the other hand the parallel vibration amount P is less than the threshold value β, then in a step S46 it is determined whether or not the timer value T exceeds zero. If the timer value T exceeds zero, then in a step S47 the timer value T undergoes a decrement such that T=T−1 and no disturbance correction control is carried out in a step S45. By contrast, if the timer value T equals zero, then in a step S48 the disturbance correction amount Sb is obtained, in a step S49 the disturbance correction amount Sb is added to the control amount Sa to obtain a control amount S, and in a step S50 the control object 9c is moved by amount S to the target position.

According to the magnetic disk drive unit control method and the disk drive unit of the sixth embodiment of the present invention as described above, the same advantages of the control method of the magnetic disk drive unit according to the fifth embodiment described above can be obtained even if the parallel vibration amount remains near the threshold level for more than a predetermined period of time.

A description will now be given of a magnetic disk drive unit control method and disk drive unit according to a seventh embodiment of the present invention. As described below, the seventh embodiment pertains to an embodiment in which the correction control unit for correction control is provided with a filter.

Figure 11:
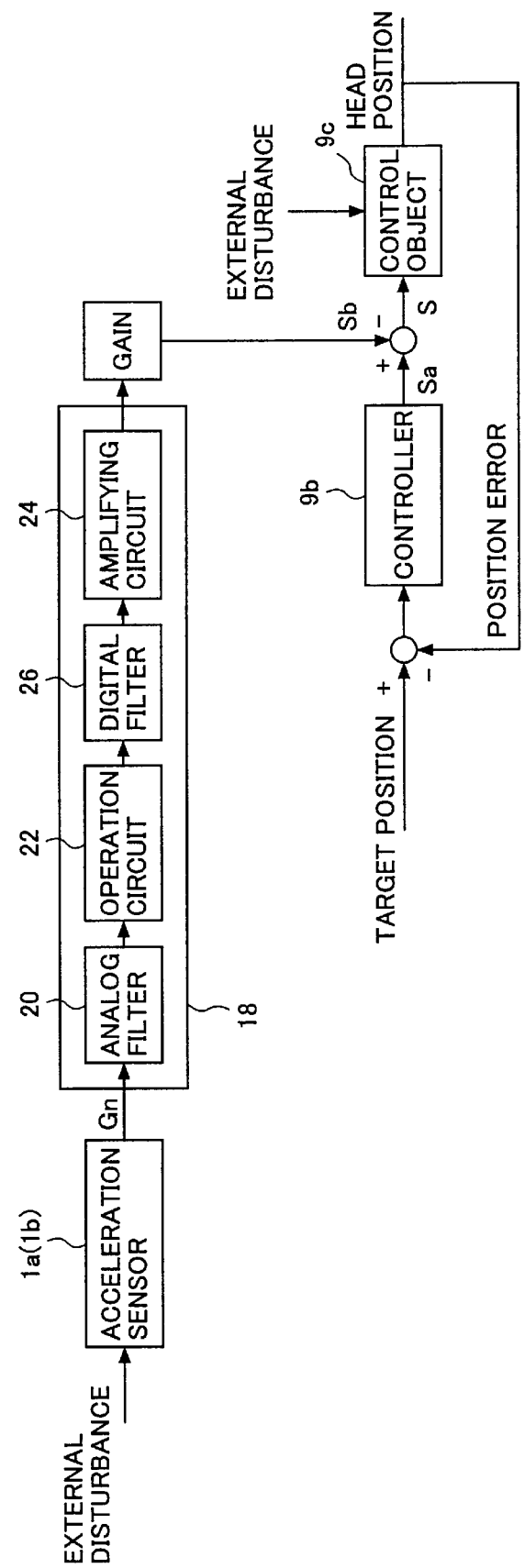
FIG. 11 is a circuit structure diagram for illustrating a correction control unit of a magnetic disk drive unit upon which are mounted acceleration sensors according to a seventh embodiment of the present invention.

FIG. 11 is a circuit structure diagram for illustrating a correction control unit of a magnetic disk drive unit upon which are mounted acceleration sensors according to a seventh embodiment of the present invention.

Figure 12:
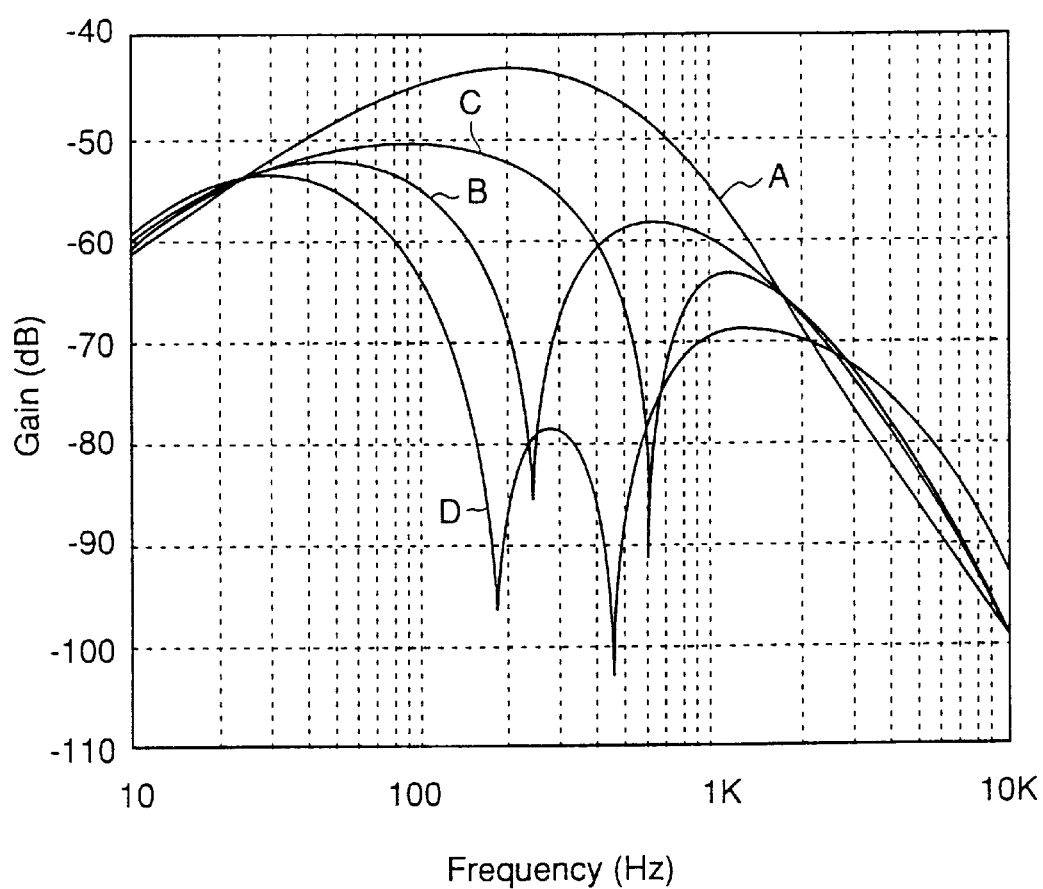
FIG. 12 is a diagram showing an position error gain of a magnetic disk drive unit upon which are mounted acceleration sensors according to one embodiment of the present invention.

FIG. 12 is a diagram showing an position error gain of a magnetic disk drive unit upon which are mounted acceleration sensors according to one embodiment of the present invention.

As shown in the flow chart and diagram, the correction control unit 18 comprises analog filters 20 such as a low-pass filter for eliminating an acceleration sensor resonance point and a high-pass filter for eliminating a direct current component when amplifying the output from the acceleration sensors 1a, 1b, an operation circuit 22, and an amplifying circuit 24 for obtaining an amplified correction control signal.

The seventh embodiment of the present invention further has a phase-advanced correction filter as a digital filter 26.

When the correction control unit 18 comprises only an analog filter 20 without the digital filter 26, an operation circuit 22, and an amplifying circuit 24, it can happen that the phase of the disturbance correction value obtained from the characteristics of this circuit can differ from the phase of that disturbance. This phase difference diminishes the effectiveness of the disturbance correction control.

This tendency is shown in the simulation-based gain graph depicted in FIG. 12. In FIG. 12, A represents a case in which no disturbance correction control by the acceleration sensors is conducted, B represents a case in which disturbance correction control is conducted without the aid of a digital filter, and C represents a case in which disturbance correction control is carried out with the aid of a digital filter. In B as compared to A, a large disturbance correction is obtained in the 200 Hz frequency bandwidth where there is no phase difference, but at frequencies below 200 Hz a phase advance is created by the high-pass filter and at frequencies above 200 Hz a phase lag is created by the low-pass filter and the operation time lag, with a consequent weakening of the disturbance correction in both cases. By contrast, in case C, the phase advance correction filter causes the frequency at which the phase of the disturbance correction value and the phase of the disturbance match to move to 600 Hz, at which frequency a large disturbance correction effect can be obtained.

For ease of explanation, a description of case D in FIG. 12 shall be deferred.

Figure 13:
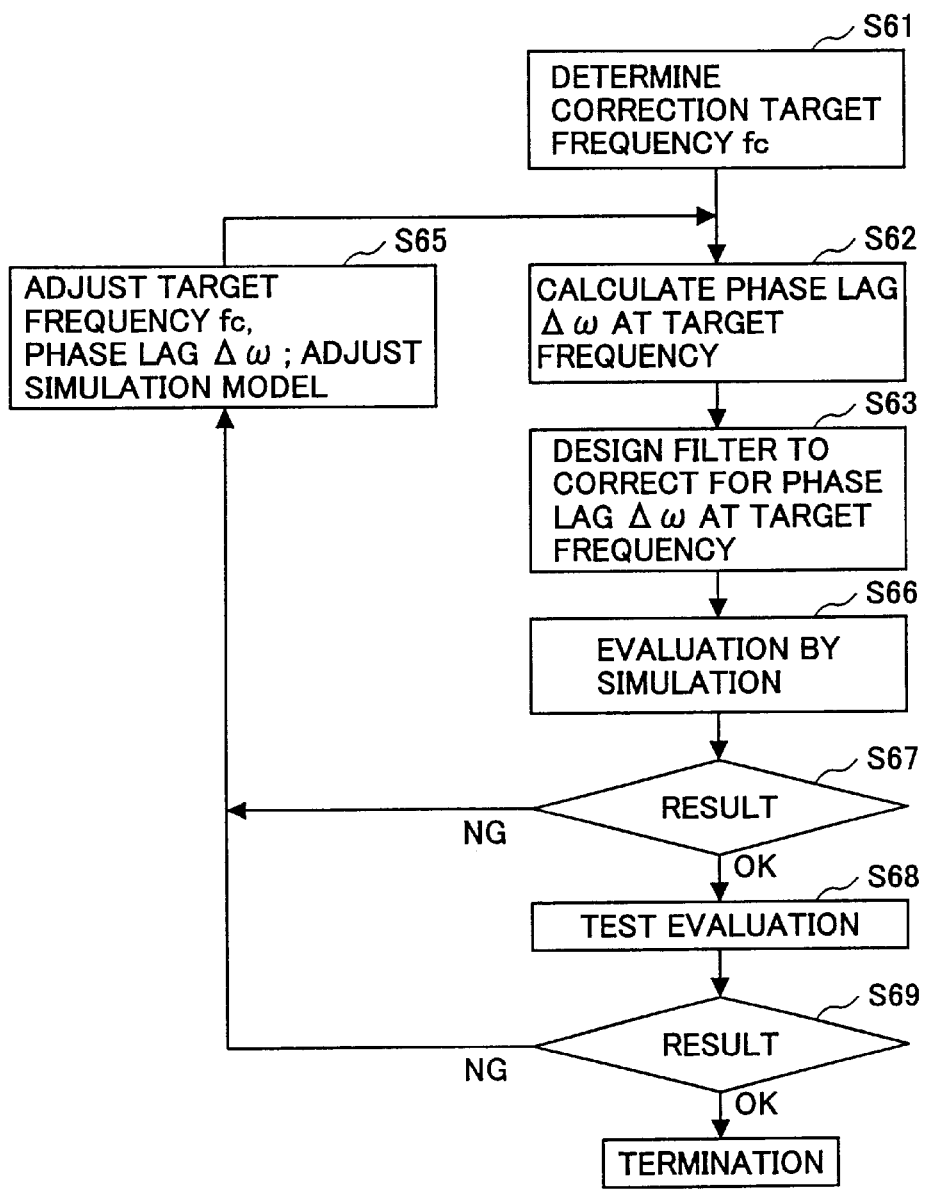
FIG. 13 is a flow chart showing steps in a process of designing a filter of the magnetic disk drive unit according to the seventh embodiment of the present invention.

FIG. 13 is a flow chart showing steps in a process of designing a filter of the magnetic disk drive unit according to the seventh embodiment of the present invention acceleration sensor described above.

First, in a step S61, a correction target frequency is provided. In FIG. 12, the correction target frequency is 600 Hz.

Next, in a step S62, the phase lag $\Delta\omega$ at the correction target frequency is calculated, and further, in a step S63 a correction filter is designed that corrects the phase lag $\Delta\omega$ at the correction target frequency. In this case, the target frequency transfer function F(s) of the phase advance correction filter centering on the correction target frequency fc can be obtained by the following formula:

$$F(s)=(s+2\pi fc/\sqrt{Y})/(s+2\pi fc\sqrt{Y})$$

By varying the value of Y in the above formula, the amount of the phase advance at the frequency fc can be adjusted. The disturbance correction gain can then be adjusted with respect to the phase correction filter gain change. Then, in a step S66 the simulation evaluation is carried out and in a step S67 the results evaluated.

If the results are poor, then in a step S65 the target frequency undergoes a fine adjustment and the simulation model is adjusted. If on the other hand the results are good, then in a step S68 the results undergo a test evaluation and the results evaluated in a step S69.

If these results are poor, then in the step S65 the target frequency undergoes a fine adjustment and the simulation model is adjusted. If on the other hand the results are good, then the filter design is complete.

A description will now be given of a magnetic disk drive unit control method according to an eighth embodiment of the present invention.

Figure 14:
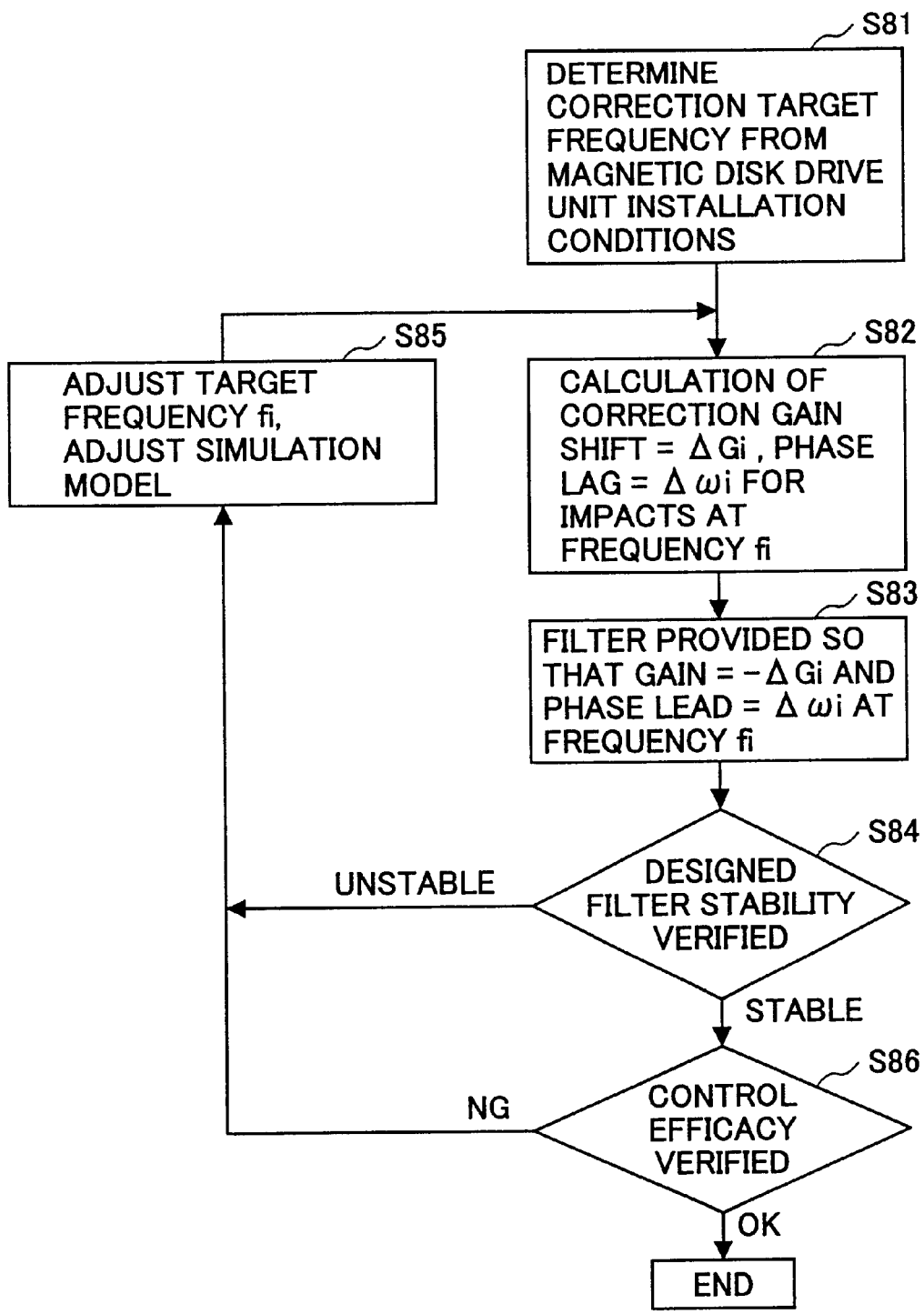
FIG. 14 is a flow chart illustrating a corrective control unit of a magnetic disk drive unit upon which are mounted acceleration sensors according to an eighth embodiment of the present invention.

FIG. 14 is a flow chart illustrating a corrective control unit of a magnetic disk drive unit upon which are mounted acceleration sensors according to an eighth embodiment of the present invention.

The control method according to the eighth embodiment of the present invention concerns filter design for the case C in FIG. 12 discussed above with respect to the seventh embodiment of the present invention. A phase advance correction filter is provided as the digital filter 26 of FIG. 11, with gain as well as phase being corrected for a plurality of correction target frequencies fi (i=1, 2 . . . n).

Initially, in a step S81 the correction target frequency is determined from the magnetic disk drive unit.

Next, in a step S82, an disturbance correction value gain shift $\Delta Gi$ and a phase lag $\Delta\omega i$ at the correction target frequency are calculated, and further, in a step S83, a filter is designed such that the gain is $-\Delta Gi$ and a phase advance is $\Delta\omega i$.

Then, in a step S84 the filter stability is evaluated and, if the filter is determined to be unstable, then the target frequency fi is adjusted and the simulation model is adjusted in a step S85, and the target frequency fi gain shift $\Delta Gi$ and a phase lag $\Delta\omega i$ are recalculated in the step S82. If, on the other hand, the filter is determined to be stable, then its control efficacy is verified in a step S86.

If the results are poor, then the target frequency undergoes a fine adjustment and the simulation model is adjusted in a step S85. If on the other hand the results are good, then the design of the filter is completed.

Using the above-described phase advance correction filter in the case D in FIG. 12 mentioned above, a large disturbance correction effect can be obtained at two frequencies, i.e., at approximately 200 Hz and approximately 500 Hz.

FIG. 15 is a diagram illustrating a corrective control unit of a magnetic disk drive unit upon which are mounted acceleration sensors according to a ninth embodiment of the present invention.

As shown in FIG. 15, the correction control unit 30 is provided with a phase correction filter (digital filter) 32 and a notch filter 34 on a stage prior to the phase correction filter 32, and further, with a band limiting filter 36 provided between the notch filter 34 and the phase correction filter 32. The notch filter 34 removes the acceleration sensor resonance frequency component and the band limiting filter 36 removes the noise.

According to the magnetic disk drive unit control method according to the ninth embodiment of the present invention as described above, adverse effects on the correction control can be reduced.

The above description is provided in order to enable any person skilled in the art to make and use the invention and sets forth the best mode contemplated by the inventor of carrying out the invention.

The present invention is not limited to the specifically disclosed embodiments, and variations and modifications may be made without departing from the scope and spirit of the present invention.

The present application is based on Japanese Priority Application No. 2000-164944, filed on Jun. 1, 2000, the entire contents of which are hereby incorporated by reference.

What is claimed is:

1. A control method for a disk drive unit upon which are mounted acceleration sensors at arbitrary positions, the control method comprising a step of changing a sequence for calculating an amount by which a head actuator is adjusted during recording and readout operations based on an output from the acceleration sensors, wherein the calculation of the amount is performed without using location information of the acceleration sensors.

2. A control method for a disk drive unit upon which are mounted two acceleration sensors positioned at arbitrary positions a predetermined distance apart, the control method comprising a step of changing a sequence for calculating an amount by which a head actuator is adjusted during recording and readout operations based on an output from the two acceleration sensors sensing parallel components of an external disturbance on the disk drive unit in a direction parallel to a surface of a disk, wherein the calculation of the amount is performed without using location information of the acceleration sensors.

3. The control method as claimed in claim 2, wherein:
the two acceleration sensors are positioned so as to detect the component of the disturbance in the direction of the surface of the disk; and
a sum and a difference of the outputs of the two acceleration sensors are calculated and a correction gain adjusted based on the calculated sum and difference.

4. The control method as claimed in claim 3, wherein no disturbance correction control is conducted if an amount of the disturbance in the direction of the surface of the disk meets or exceeds a threshold value, the threshold value being based on a difference between an absolute value of the sum of the acceleration sensor outputs and an absolute value of the difference of the acceleration sensor outputs.

5. The control method as claimed in claim 4, wherein no disturbance correction control is conducted for a predetermined period of time when the amount of the disturbance in the direction of the surface of the disk meets or exceeds the threshold value.

6. The control method as claimed in claim 5, wherein no disturbance correction control is conducted for a further predetermined period of time if the amount of disturbance in the direction of the surface of the disk again meets or exceeds the threshold value during the predetermined period of time during which no disturbance correction control is conducted.

7. The control method as claimed in claim 3, wherein recording of information is stopped when the amount of the disturbance in the direction of the surface of the disk meets or exceeds the threshold value based on a difference between an absolute value of a difference between the sum of the acceleration sensor outputs and the difference of the acceleration sensor outputs.

8. A control method for a disk drive unit upon which are mounted two acceleration sensors at arbitrary positions, the control method comprising a step of eliminating a resonance frequency component of the acceleration sensors prior to adjusting phase of outputs of the acceleration sensors, and a step of adjusting the phases of the outputs of the acceleration sensors so as to adjust a correction output.

9. The control method as claimed in claim 8, further comprising a step of adjusting phases of a plurality of predetermined frequency components of outputs of the acceleration sensors.

10. The control method as claimed in claim 8, further comprising a step of adjusting the phases and gains of predetermined frequency components of outputs of the acceleration sensors.

11. A disk drive unit upon which are mounted, at arbitrary positions, acceleration sensors, the disk drive unit comprising a correction control unit for changing a sequence for calculating an amount by which a head actuator is adjusted during recording and readout operations based on an output from the acceleration sensors, wherein the calculation of the amount is performed without using location information of the acceleration sensors.

12. The disk drive unit as claimed in claim 11, wherein the correction control unit comprises a phase advance correction filter.

13. The disk drive unit as claimed in claim 12, wherein the correction control unit further comprises a notch filter on an anterior stage of the phase advance correction filter.

* * * * *